Nov. 9, 1965
E. G. CAFLISCH
3,217,149
AUTOMATIC INTEGRATION
Filed Nov. 30, 1960
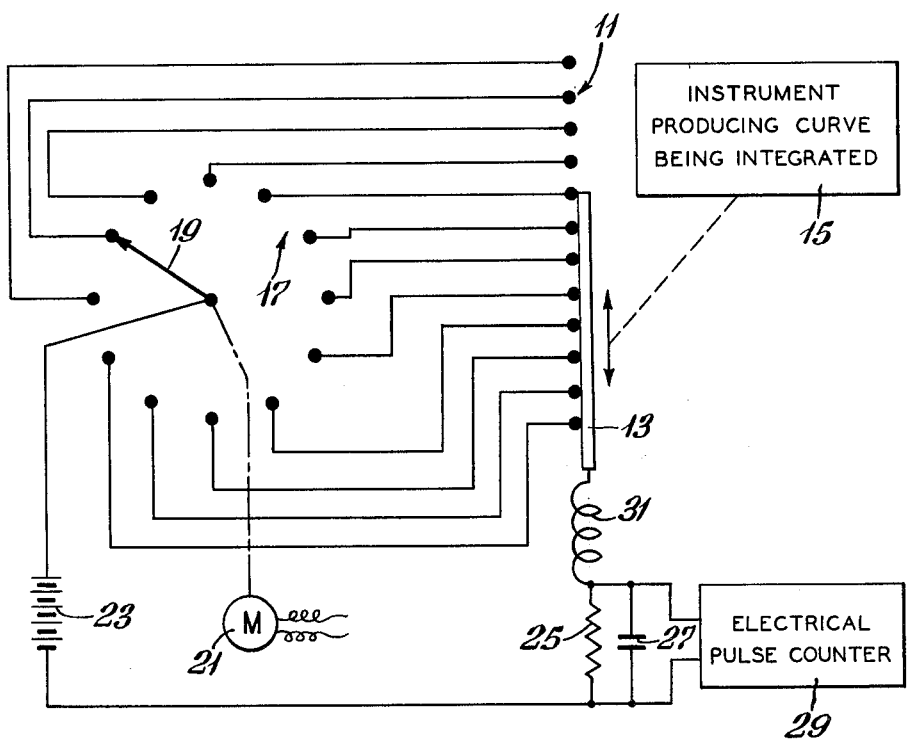
*INVENTOR*
EDWARD G. CAFLISCH
By Howard K. Kothe
*ATTORNEY*

3,217,149
AUTOMATIC INTEGRATION
Edward G. Caflisch, South Charleston, W. Va., assignor to Union Carbide Corporation, a corporation of New York
Filed Nov. 30, 1960, Ser. No. 72,624
2 Claims. (Cl. 235—183)

The present invention relates to a method of and apparatus for automatic integration and more particularly, to such method and apparatus adapted to integrate curves produced on rectilinear coordinate axes by recording instruments such as strip chart recorders and recording potentiometers. The method and apparatus which comprise the present invention are especially useful in automatic integration of directly sensed pressures and of curves produced by analyzers which employ continuous amplitude vs. time type data readouts.

The industrial and scientific arts frequently use curvilinear traces on rectilinear coordinate axes to represent data outputs from analytical apparatus and to indicate varying values of continuous process control parameters. Quantitative interpretation of the recorded output data of such analyzers and sensing equipment used in process parameter measurement is based on the correlation of either peak heights or peak areas of curves traced on the coordinate axes with respective concentrations of the components of the sample analyzed or the values of the parameter sensed. While peak height measurement is the simpler of the two techniques, area measurement has been found to be more reproducible and more linearly related to concentration of the component represented by a particular peak or the value of the parameter so sensed. The area under a curve representing any function $f(x)$ corresponds to the definite integral of the particular function represented by the curve between two abscissal limits in accordance with the conventional expression $$\int_{x_1}^{x_2} f(x)\,dx$$

Analysis procedures in the chemical and related arts frequently require the integration of curvilinear traces representing functions. Fundamental theories of mathematics provide the most exact integration methods for curve functions of the lower exponential orders. Complex and high order functions, however, frequently require relatively ponderous computations. For the simple as well as the complex functions, several known approximate methods of integration yield results of sufficient accuracy for the needs of analysts or industrial operators. Most elemental of the approximate methods of integration is that wherein the particular curve to be integrated is superposed on a set of rectilinear coordinates and the area under the curve, which is the integral of the curve, is computed approximately by counting squares, or, more accurately, by the use of a planimeter. Other approximate integration methods include Simpson's Rule, expansion of the curve function into a converging power series followed by term by term integration and summation and the method using the Coradi mechanical integraph which provides a means of drawing the curve $y=\int f(x)\,dx$ when the curve $y'=f(x)$ is given. Whether based upon an exact or an approximate method, integration which can be performed automatically rather than by human computation can save analysts many hours of time.

Automatic integrators known prior to the present invention fall essentially into either of two general categories, viz. those operating on the principle of variation of mechanical speed and those operating on the principle of variation of an electrical frequency, as the height of the function curve varies. All such known automatic integrators have been found to have certain disadvantageous characteristics, such as nonlinearity, poor response and drift; such characteristics seriously limit the applicability of these integrators, particularly in fields of analysis where an unusually high order of instrument accuracy and reproducibility is required.

It will be obvious to those skilled in the art that an automatic integrator which continually measures the height of a function curve at fixed, closely spaced intervals of time as the function curve is traced, to produce a sum of all the height measurements, said sum representing the integral of the function curve, and this with an unusually high degree of accuracy and reproducibility, fulfills a great need in the analytical and industrial arts and represents an outstanding advance over known methods and apparatus. The apparatus of the present invention, by utilizing a constant speed driving motor, in combination with a pulse generating signal circuit, provides such an automatic integrator.

In general, the apparatus and method of my invention comprises a constant speed motor driving a contact arm on a rotary switch. In circuit with contacts contacted by the rotor of the rotary switch during each revolution thereof, means responsive to a continuous varying signal (representing the function being integrated) controls the number of pulses which will be transmitted from said rotary switch to a pulse counting device. My invention, being electromechanical in principle, has few moving parts and is therefore not as subject to the aberrative effects of wear, inertia, slippage or defective loading or machining as are known integrators. Because it does not utilize any variable frequency electronic oscillator components, higher linearity over known electronic integrators is attained.

With the foregoing and other features in view, which shall more fully hereinafter appear, my invention comprises novel constructions, combinations and arrangements of components as will now be described in detail and as defined in the appended claims and as illustrated in the appended drawing, which is a combination schematic-block diagram presentation of a single embodiment of the apparatus of the present invention.

Basic operation of the apparatus of the present invention may be best understood by reference to the drawing. A shorting switch 11, having a plurality of contacts which can be selectively connected by a shorting wipe 13 is operably connected to a signal transmitting source 15 which comprises an instrument or apparatus producing a continuous varying signal proportional to the function being integrated. A mechanical connection between signal transmitting source 15 and shorting wipe 13 of shorting switch 11 is such that the number of fixed contacts of said shorting switch joined in circuit with the shorting wipe varies in direct proportion with the amplitude of the signal representing the function being integrated. A rotary switch 17, having a plurality of fixed contacts, each of which is in circuit with a respective fixed contact of shorting switch 11, and a rotor 19, is driven by a synchronous motor 21, to contact sequentially each of the fixed contacts of rotary switch 17 during each revolution. In circuit with the rotor 19 of rotary switch 17, an electrical potential source 23 supplies circuit voltage, and a loading resistor 25 paralleled with a surge capacitor 27 and a flexible electrical connection 31 to the moving wipe 13 of shorting switch 11 completes a pulse generating circuit. An electrical pulse counter 29 is connected across the combination of loading resistor 25 and surge capacitor 27 and counts, during each revolution of rotor 19 the number of pulses determined by the position of shorting wipe 13 with respect to the fixed contacts of shorting switch 11. The pulses counted represent digitals of the integral of the function controlling signal transmitting source 15. Thus, in effect, the fixed frequency rotation of rotor 19 of rotary switch 17 divides the area under the function curve into minute abscissal increments and, since the number of pulses counted for each increment is proportional to the curve ordinate for that increment, the combination comprising the shorting switch, the signal transmitting source, the counting circuit and the pulse counter measures and records the height of each such abscissal increment. Totaling these measurements yields the integral of the curve. For most analytical instruments utilizing strip chart recorders, the signal transmitting device 15 comprises the pen drive of the recorder, which is operably connected by any suitable mechanical linkage to the shorting wipe 13 of shorting switch 11. Thus, it can be readily seen that when the recording pen of such a strip chart recorder is at a low amplitude position, only a few of the fixed contacts of shorting switch 11 will be connected to the counting circuit through shorting wipe 13 and the number of pulses passed through the counting circuit will correspond to the number of circuit-connected fixed shorting switch contacts. As a curve is traced and the recording pen varies position through greater amplitudes, additional fixed contacts of shorting switch 11 will be joined into the counting circuit, proportionally increasing the number of digital pulses registered on counter 29 for each complete revolution of rotor 19 of rotary switch 17.

In a particular embodiment of my invention, a laboratory type mercury manometer with 64 regularly spaced electrical contacts between zero scale and full scale manometer divisions is used as a shorting switch 11, with a column of mercury therein functioning as a shorting wipe 13. Each of the 64 contacts on the manometer is connected to a pole on a 64 pole rotary-type mercury switch having a rotor 19. A pulse generating circuit is completed through a loading resistor 25 paralleled with a surge capacitor 27, a battery as potential source 23, a connector 31 to the mercury column in the manometer (which, with a mercury shorting wipe, need not be flexible), the manometer fixed contacts and the rotary type mercury switch. A standard commercially available laboratory-type pulse responsive digital counter is connected across the parallel combination of the loading resistor and the surge capacitor. A synchronous motor drive is operably connected to the rotor of the rotary mercury switch and is adapted to drive said rotor at exactly 30 revolutions per second. The manometer is connected, in the customary manner, to any two points between which there exists a pressure differential. As the column of mercury rises and falls according to varying sensed pressure differentials, the number of pulses developed across the resistor-capacitor combination and registered on the counter is proportional to and representative of the integral of the pressure function. Accuracy of the above-described embodiment of the apparatus of my invention in integrating controlled step-form pressure functions has been found to be within ±0.8 percent.

Individual components of the apparatus of my invention can take other forms known to the art. The shorting switch can be a mercury column similar to that in a manometer, but maintained in a fixed position in a tube having a multiplicity of spaced interconnected contact points with a moveable shield to selectively prevent the mercury from contacting a number of the points, according to the amplitude of the function being integrated. In such an embodiment the motivating force for the shield, which corresponds to a shorting wipe operating in reverse, can be driven by a mechanical linkage to a recorder pen drive functioning as a signal transmitter 15 and the integrator can be operated to yield readouts proportional to the integrals of functions being traced by the recorder pen.

A system utilizing light beams can also be employed, should this be found desirable for a particular application. In a light beam embodiment, a reflecting mirror is attached at an angle from the axis of rotation of a synchronous motor 21 to the shaft of said motor, arranged to reflect light beams from an array of evenly spaced light sources, arranged circularly around the synchronous motor rotational axis, to a photonic signal generator such as a photo tube or cell. A shorting switch in circuit with the light sources determines the number of lights on, according to the amplitude of the function being integrated, or, alternatively, a movable shield can be adapted to cover a portion of the light sources in a manner analogous to that in which the shield of the above-described mercury column embodiment functions.

The exact speed at which the rotary switch 17 is driven is not critical but it is important that the selected speed be maintained constant. The minimum rotational speed depends on the degree of accuracy sought and the maximum upon the maximum rate of change of the function being integrated. Another important factor which affects accuracy of the invention is the number of poles or contact points on the switches used, since this determines the number of counts registerable for each of the abscissal increments into which the function curve is divided. The maximum integrating speed will also be affected by the time rate counting capacity of the counter selected. Response linearity depends on the spacing of the contacts on the shorting switch component or light source spacing in its analogous component in the light beam embodiment. Normally, the spacing would be equal to attain uniform linearity but special effects can be achieved, where required in particular applications, by other than equal spacings. The contacts of shorting switch 11 need not be connected to the contacts of rotary switch 17 in any particular order but special orders can be used to allow smoother operation of the counter.

Those skilled in the art will readily see many possible further modifications to my invention. The selection and application of numerous equivalent components which combined will comprise the apparatus of my invention will undoubtedly be suggested by the foregoing description to persons familiar with the art.

It will therefore be obvious that, while in the foregoing description, certain specific details and operative steps have been set forth, together with certain suggested modifications, additional variations may be made in these without departing from the spirit of the present invention. The foregoing description has been given for clearness of understanding only, and no unnecessary limitations should be understood therefrom.

What is claimed is:

1. An automatic integrator comprising, in combination, a multipole continuous rotation rotary-type electrical switch for continuously developing groups of pulseform signals at a continually constant frequency and having a rotor driven by a constant speed motor; a multipole electrical wiping switch having a conducting wipe, said rotary-type switch and said wiping switch being so interconnected that said conducting wipe can be moved to make electrical contact with a variable number of the poles of said rotary type switch; means continuously producing a function being integrated, operably connected to and controlling the conducting wipe of the multipole wiping switch to make the number of pulseform signals in each group proportional to the substantially instantaneous value of said function being integrated; pulse counting means in circuit with said conducting wipe whereby said signals are continually counted as digitals of the integral of said variable function; and an electrical potential source in circuit with said rotary switch, said wiping switch wipe and said pulse counting means.

2. In combination with an apparatus which is continuously producing a signal representative of and proportional to a function which is to be integrated, an automatic integrator comprising a substantially constant amplitude signal source; a multipole continuous rotation rotary-type electrical switch for continuously developing groups of pulseform signals at a continuously constant frequency from said substantially constant amplitude signal source, said rotary-type switch having a rotor driven by a constant speed motor; a multipole electrical wiping switch having a conducting wipe, said rotary-type switch and said wiping switch being so interconnected that said conducting wipe can be moved to make electrical connection with a variable number of the poles of said rotary-type switch, said conducting wipe being operably connected to and driven by said first recited apparatus to make the number of pulseform signals in each group proportional to the substantially instantaneous value of the function being integrated; and pulse counting means in circuit with said substantially constant signal source, said rotary-type switch and said conducting wipe whereby said signals are continually counted as digitals of the integral of a variable function being integrated.

References Cited by the Examiner

UNITED STATES PATENTS

| | | | |
|---|---|---|---|
| 2,398,238 | 4/46 | McNatt | 235—183 |
| 2,431,591 | 11/47 | Snyder et al. | 235—154 |
| 2,643,355 | 6/53 | Hallman | 235—154 |
| 2,725,191 | 11/55 | Ham | 235—183 |
| 2,950,053 | 8/60 | Hirsch | 235—183 |
| 3,036,766 | 5/62 | Strandberg | 235—154 X |
| 3,063,635 | 11/62 | Gordon | 235—154 X |
| 3,070,303 | 12/62 | Schad | 235—183 X |

MALCOLM A. MORRISON, *Primary Examiner.*

CORNELIUS D. ANGEL, *Examiner.*